Patented June 2, 1936

2,043,164

UNITED STATES PATENT OFFICE 2,043,164

BASIC IMIDAZOLE COMPOUNDS WHICH ARE USEFUL TEXTILE ASSISTING AGENTS AND PROCESS OF MAKING SAME

Charles Gränacher, Basel, Switzerland, assignor to "Society of Chemical Industry in Basle", Basel, Switzerland No Drawing. Original application April 20, 1933, Serial No. 667,133. Divided and this application September 10, 1934, Serial No. 743,483. In Switzerland April 27, 1932

11 Claims. (Cl. 260—44)

This is a division of my application for patent Serial No. 667,133, filed in U. S. A. on April 20, 1933, and in Switzerland on April 27, 1932 and July 29, 1932.

The present invention relates to the production of new textile auxiliaries which are basic imidazole compounds, and comprises the method of producing same, as well as the new products themselves.

According to this invention new products which are valuable as assisting agents are made by converting into a water-soluble compound by peralkylation or peraralkylation a cyclic amidine which on the one hand is derived from an ortho-arylene-diamine and on the other hand is substituted at the $\mu$-carbon atom by an aliphatic or hydroaromatic residue containing at least 3 carbon atoms. Such water-soluble products are likewise obtained by subjecting such a cyclic amidine to exhaustive alkylation or aralkylation.

The new products are thus water-soluble derivatives of the cyclic amidines of the general formula—

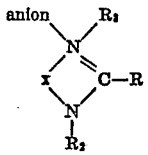

wherein $x$ stands for a ring of the benzene or naphthalene series which is directly linked up with the two nitrogen atoms by two vicinal carbon atoms, $R_1$ stands for an aliphatic radicle consisting itself of at least 3 carbon atoms, and $R_2$ and $R_3$ stand for alkyl or aralkyl. These products, in the form of the salts which they form with acids, constitute colorless to light colored powders which dissolve in water to form solutions having strong capillary active properties. The term capillary active is understood to mean here both the diminished surface tension of the solutions, and their dispersing, emulsifying and cleansing capacity.

The new products form with acids salts whose aqueous solutions have a remarkable effect in promoting washing, emulsification, levelling, dispersion and wetting. They are thus applicable as valuable assistants in the textile industry as well as in all other branches of industry in which such auxiliaries are used. The products obtainable by the invention have still other properties; for example, they form insoluble precipitates with dyestuffs, so that they are useful for rendering dyeings fast to water. Finally a number of the new products can be used for the production of softening agents.

As cyclic amidines suitable as parent materials for the invention there may be named quite generally the benzimidazoles or perimidines, including those substituted in the NH-group by alkyl, aralkyl or aryl residues, which are obtainable from ortho-phenylene-diamine or its homologues or analogues, such as ortho-toluylene-diamine, ortho-chlorinated-phenylene-diamines, ortho-nitraniline, ortho-amino-diphenylamines, ortho-aminomonomethylaniline, ortho-naphthylene-diamines, and from aliphatic acids, such as butyric acid, caproic acid, caprylic acid, capric acid, lauric acid, arachic acid, cerotic acid or the like, or from a naphthenic acid or from mixtures of suitable acids.

The peralkylation or peraralkylation, is advantageously brought about by treatment with suitable alkylating aralkylating or arylating agents; examples of such agents are benzylchloride, chloromethyl-naphthalene and derivatives thereof, alkyl-halides, halogen alkyl-sulfonic acids, chlorhydrins, epichlorhydrins, alkyl-sulfates etc.

The manufacture and application of the new textile assisting agents can be illustrated by the following examples, the parts being by weight:—

Example 1

100 parts of a technical mixture of stearic and palmitic acids and 41 parts of ortho-phenylene-diamine are melted together and the melt is maintained at 200° C. for 20 hours, advantageously with exclusion of air. In order to remove the last traces of moisture a current of dry carbon dioxide or nitrogen is passed through the reaction vessel above the melt. Thus is prepared a mixture of pentadecyl- and heptadecyl-benz-imidazole. This mixture is allowed to cool to 140–120° C., whereupon 46 parts of benzyl-chloride are gradually added. After the mixture has been stirred for 6 hours at 140–150° C., the temperature is raised to 170° C. and stirring is continued for a further 6 hours. The reaction mixture contains the hydrochloride of the benzylated imidazoles.

40 parts of the mixture of benzylated benzimidazole hydrochlorides thus obtained and 200 parts of sodium carbonate solution of 10 per cent. strength are stirred together at about 50° C. until there is precipitated a brownish oil. The oil is separated from the aqueous layer, washed with water until the washings no longer show an alkaline reaction and dried at 40-90° C. under reduced pressure.

Instead of the benzyl chloride used in this example there may be used another fatty-aromatic, aliphatic or aromatic halogen-compound containing readily exchangeable halogen, such as derivatives of benzyl-chloride, chloromethyl-naphthalene and derivatives thereof, nitrated chlorobenzenes, alkyl-chloride, halogen-alkyl sulfonic acids and others.

*Example 2*

241 parts of the mixture of benzylated-benzimidazole hydrochlorides made as described in Example 1 are melted at 120-125° C. and there are added to the melt gradually and whilst stirring 60 parts of finely powdered anhydrous sodium carbonate and, when evolution of carbon dioxide has ceased, 70 parts of benzyl-chloride. The mixture is then stirred for 6-10 hours at 125° C. and then allowed to cool.

For purifying the product, the crude reaction mass is filtered whilst still molten in order to remove sodium carbonate and other inorganic constituents and the solidified filtrate is extracted with an organic solvent, such as benzene, in order to remove any parent materials which may still be present. There is thus obtained the quaternary ammonium salt of the benzylated benzimidazoles of the formula—

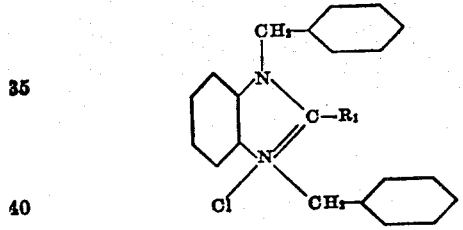

in which $R_1$ represents heptadecyl or pentadecyl radicles. The product is a colorless crystalline powder which is soluble in hot water to a solution having a strong tendency to foam.

If instead of benzylchloride there is used an equimolecular quantity of 2:4-dichloro-1-nitrobenzene a similar product is obtained. It is also possible to convert the mixture of μ-heptadecyl-benzimidazole μ-pentadecyl-benzimidazole, by the action of dimethylsulfate in presence of sodium carbonate, into a quaternary methylated ammonium salt of the formula—

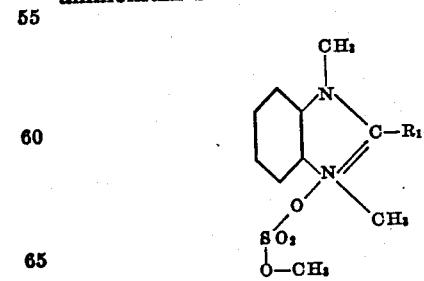

in which $R_1$ represents heptadecyl or pentadecyl radicles, which is soluble in water to solutions having a tendency to foam, and has also the property of precipitating dyestuffs from their solutions. The products named in this example are useful for rendering fast to water dyeings produced on natural or regenerated cellulose by means of direct dyestuffs.

*Example 3*

66.8 parts of μ-heptadecenyl-benzimidazole and 27.2 parts of benzylchloride are stirred together for 6 hours at 160-165° C. There are then added gradually, the temperature being maintained constant, 20.6 parts of calcined sodium cabonate and 100 parts of trichlorobenzene and the whole is stirred for half an hour. Then further 27.2 parts of benzylchloride are added and after the mixture has been stirred for 2 hours it is cooled and filtered. The residue is washed with benzene and dried; the further procedure is as described in Example 2.

The procedure in this and in the previous examples is similar if instead of μ-heptadecenyl-benzimidazole there is used μ-undecyl-benzimidazole, μ-propyl-benzimidazole and so on, or mixtures thereof.

The products so obtained form coarse powders which dissolve in water to produce solutions having a tendency to foam. They have the properties of promoting wetting and of improving the fastness of direct dyestuffs towards water.

*Example 4*

35.6 parts of μ-heptadecenyl-benzimidazole, 9.3 parts of epichlorhydrin and 100 parts of chlorobenzene are stirred together for 6 hours at 120-130° C. There are then added 10.6 parts of anhydrous sodium carbonate and further 9.3 parts of epichlorhydrin. After the reaction mixture has been stirred for 2 hours it is cooled and the mixture of salts is separated by filtration; for purification the further procedure is as described in Example 2. The formula of the new product corresponds very probably to the formula—

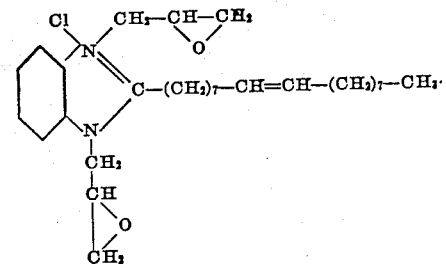

The application of the new products as textile assisting agents can be illustrated inter alia as follows:—

(a) 100 parts of wool are dyed in a bath containing 4 per cent. of Neolan Violet 5R (Colour Index, page 360), 5 per cent. of sulfuric acid and 0.02 per cent. of heptadecyl-N:N-dibenzyl-benzimidazolium-chloride. The goods are introduced at 60° C., the temperature is raised to boiling in the course of 20 minutes and boiling is continued for a further ¾ hour.

In this manner the wool is dyed substantially more deeply and evenly than in the case in which sulfuric acid is used alone.

(b) 100 parts of cotton yarn are dyed for 1 hour in a bath containing 2.5 per cent. of direct sky blue, green shade (Colour Index No. 518), 30 per cent. of crystallized sodium sulfate and 2 per cent. of sodium carbonate, the ratio of goods to liquor being 1:20 and the operation being conducted at a temperature close to the boiling point of the bath. The yarn is then rinsed and after-treated for 20 minutes in a cold bath containing per litre 1 gram of heptadecyl-N:N-dibenzyl-benzimidazole-chloride. On testing the dyed yarn with water, it is found that the dyeings on the after-treated yarn are appreciably faster to water than those on the yarn which has not been after-treated.

What I claim is:—

1. Process for the production of water-soluble compounds, consisting in heating alkylating agents with imidazoles of the formula—

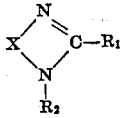

wherein $x$ stands for a ring of the benzene and naphthalene series, $R_1$ for an aliphatic radical containing at least 8 carbon atoms, and $R_2$ for a member of the group consisting of alkyl and benzyl.

2. Process for the production of water-soluble compounds, consisting in heating alkylating agents with imidazoles of the formula—

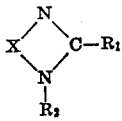

wherein $x$ stands for a ring of the benzene and naphthalene series, $R_1$ for an aliphatic radical containing at least 8 carbon atoms, and $R_2$ for a member of the group consisting of alkyl and benzyl.

3. Process for the production of water-soluble compounds, consisting in heating alkylating agents with imidazoles of the formula—

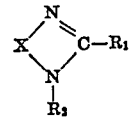

wherein $x$ stands for a ring of the benzene and naphthalene series, $R_1$ for a straight, saturated aliphatic chain containing at least 8 carbon atoms, and $R_2$ for a member of the group consisting of alkyl and benzyl.

4. Process for the production of water-soluble compounds, consisting in heating such alkylating agents which contain at the most 3 carbon atoms with imidazoles of the formula—

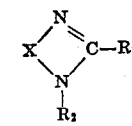

wherein $x$ stands for a ring of the benzene and naphthalene series, $R_1$ for a normal saturated aliphatic chain consisting of an odd number of carbon atoms lying between 10 and 18, and $R_2$ for a member of the group consisting of alkyl and benzyl.

5. Process for the production of water-soluble compounds, consisting in heating methylating agents with imidazoles of the formula—

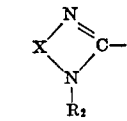

wherein $x$ stands for a ring of the benzene and naphthalene series, $R_1$ for a normal saturated aliphatic chain consisting of an odd number of carbon atoms lying between 10 and 18, and $R_2$ for a member of the group consisting of alkyl and benzyl.

6. The water-soluble derivatives of the imidazoles of the general formula—

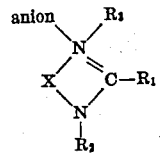

wherein $x$ stands for a ring of the benzene and naphthalene series, $R_1$ stands for an aliphatic radicle consisting itself of at least 3 carbon atoms, $R_2$ and $R_3$ stand for a member of the group consisting of alkyl and benzyl, which products, in the form of the salts which they form with acids, constitute colorless to light colored powders which dissolve in water to form solutions having strong capillary active properties.

7. The water-soluble derivatives of the imidazole of the general formula—

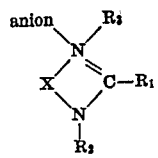

wherein $x$ stands for a ring of the benzene series, $R_1$ stands for an aliphatic radicle consisting itself of at least 8 carbon atoms, and $R_2$ and $R_3$ stand for a member of the group consisting of alkyl and benzyl, which products, in the form of the salts which they form with acids, constitute colorless to light colored powders which dissolve in water to form solutions having strong capillary active properties.

8. The water-soluble derivatives of the imidazoles of the general formula—

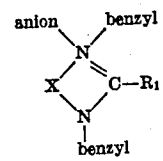

wherein $x$ stands for a ring of the benzene series, $R_1$ stands for a straight aliphatic chain consisting itself of at least 8 carbon atoms, which products, in the form of the salts which they form with acids, constitute colorless to light colored powders which dissolve in water to form solutions having strong capillary active properties.

9. The water-soluble derivatives of the imidazoles of the general formula—

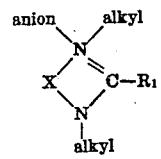

wherein $x$ stands for a ring of the benzene series, $R_1$ stands for a straight aliphatic chain consisting itself of at least 8 carbon atoms, which products, in the form of the salts which they form with acids, constitute colorless to light colored powders which dissolve in water to form solutions having strong capillary active properties.

10. The water-soluble derivatives of the imidazoles of the general formula—

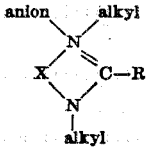

wherein $x$ stands for a ring of the benzene series, $R_1$ stands for a straight, saturated aliphatic chain consisting itself of an odd number of carbon atoms lying between 10 and 18, which products, in the form of the salts which they form with alkalies or acids, constitute colorless to light colored powders which dissolve in water to form solutions having strong capillary active properties.

11. The water-soluble derivatives of the imidazoles of the general formula—

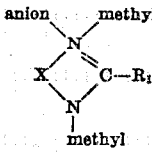

wherein $x$ stands for a ring of the benzene series, $R_1$ stands for a straight, saturated aliphatic chain consisting itself of an odd number of carbon atoms lying between 10 and 18, which products, in the form of the salts which they form with alkalies or acids, constitute colorless to light colored powders which dissolve in water to form solutions having strong capillary active properties.

CHARLES GRÄNACHER.